United States Patent
Pham et al.

[11] Patent Number: 5,862,007
[45] Date of Patent: Jan. 19, 1999

[54] METHOD AND APPARATUS FOR REMOVING BASELINE SHIFTS IN A READ SIGNAL USING FILTERS

[75] Inventors: Bac Pham, San Jose; Kingston Lin, Morgan Hill; Khoa Bui, San Jose, all of Calif.

[73] Assignee: Samsung Electronics Co., Ltd., Suwon, Rep. of Korea

[21] Appl. No.: 634,189

[22] Filed: Apr. 18, 1996

[51] Int. Cl.$^6$ .................................................. G11B 05/035
[52] U.S. Cl. ............................................ 360/65; 375/341
[58] Field of Search .................................... 375/341, 343, 375/350, 340, 229, 376; 360/113, 65; 364/724.16

[56] References Cited

U.S. PATENT DOCUMENTS

| | | | |
|---|---|---|---|
| 5,233,482 | 8/1993 | Galbraith et al. | 360/46 |
| 5,301,080 | 4/1994 | Ottesen et al. | 360/113 |
| 5,335,121 | 8/1994 | Bombeeck | 360/65 |
| 5,367,409 | 11/1994 | Ottesen et al. | 360/32 |
| 5,388,127 | 2/1995 | Scarpa | 375/376 |
| 5,497,111 | 3/1996 | Cunningham | 327/58 |
| 5,566,101 | 10/1996 | Kodra | 364/724.16 |
| 5,590,154 | 12/1996 | Forni et al. | 375/229 |

*Primary Examiner*—Nabil Hindi
*Assistant Examiner*—Patrick Wamsley
*Attorney, Agent, or Firm*—Jones & Volentine, L.L.P.

[57] ABSTRACT

A method and apparatus is disclosed for removing transient DC level shifts caused by thermal asperities (TAs), thereby reducing TA induced errors. Read signal generated by a Magneto resistive (MR) is input to a continuous time filter and a sampler. Sampler output is input to a 1-D sampled filter which performs level equalization to remove DC Shift cased by TA disturbance. Sampled filter output is input to MUX along with sampler outputs. MUX selects sampled filter output during TAs. MUX output is input to a FIR filter and Viterbi decoder. Gain and Timing loop tracking and acquisition blocks receive sampler and FIR filter output and output correction signals for use by VGA and phase/frequency Detector.

31 Claims, 6 Drawing Sheets

METHOD AND APPARATUS FOR REMOVING BASELINE SHIFTS IN A READ SIGNAL USING FILTERS

FIELD OF THE INVENTION

The present invention relates to direct access storage devices (DASD) of the type using a digital or sampled recording channel. In particular, the present invention is in the field of magnetic recording technology using magneto-resistive (MR) heads and Partial Response channels and methods for compensating for shifts in recording levels due to shifts in DC levels and MR head temperature.

BACKGROUND OF THE INVENTION

Magnetic recording of both analog and digital information has been known and practiced in the art of audio reproduction and computer secondary storage. In magnetic recording, moving media such as a tape or disk platter may be coated with a ferro-magnetic oxide or metal coating. Information may be recorded with an electrically biased head which may be modulated with an information signal and which, in response, may generate a modulated flux field. Since a recording head may be in close proximity to a section of recording media, flux changes may cause ferro-magnetic particles in recording media to align accordingly. Conversely, information may be read from media by sensing alignment of flux fields representing recorded information.

For information comprising digital data, recording heads may write and read flux reversals. Flux reversals, in conjunction with timing and coding information, may indicate presence or absence of a data bit. Methods for decoding flux reversals corresponding to recorded information and synchronizing bit recovery timing are well known in the art. In conventional head based recording, data density is based on parameters such as read head size and sensitivity. Also, retentivity—tendency of magnetic materials to retain residual magnetic flux and resist changes in flux alignment—of head materials may limit the rate at which a conventional head could sense a flux reversal and thereby limit maximum areal density readable by a head. Areal density refers to number of bits of information capable of being recorded within a linear measure of a particular magnetic recording medium.

Conventional methods to increase areal density have included using smaller, thin film inductive read heads. Inductive heads generate an electrical signal when a magnetic field moves in relation to it. A resulting induced electrical signal may be used directly to recover information from media. Inductive heads like virtually all inductive devices have the disadvantage of overshoot related to inductive discharge when faced with changing signal polarity. Additional circuitry may be necessary to remove undesirable artifacts associated with overshoot from the information signal. Other mechanical and electrical disadvantages may be associated with inductive heads. For example, relative manufacturing complexity of inductive heads may lead to electrical inconsistency giving rise to problems with electrical calibration of heads and/or read circuits.

In contrast, thin film Magneto Resistive (MR) heads or transducers may be less likely to exhibit significant differences from one head to another because their properties derive from material properties rather than head construction. MR heads may comprise a layer of permalloy material continuously biased with a sense current. When a magnetic field moves in proximity to an MR head, a change in resistance and corresponding change in sense voltage occurs based on a constant sense current. Data may be read from magnetic media by decoding a sense current signal modulated by magnetic flux transitions representing information recorded on a section of media. For greater sensitivity, so-called shielded MR heads may have a layer of magnetic material between the head element and the media.

Other limitations affecting recording density of information is the Nyquist limitations of the channels used to read and write data. The present invention deals primarily with problems associated with read channels, however Nyquist limitations are known in the art to affect maximum rates associated with any information channel. On a sampled channel, the Nyquist frequency is the minimum sampling frequency required to reproduce the original information from the sampled information. Nyquist criteria and problems associated with Nyquist rates are well known and appreciated in the art. Partial Response signalling or correlative coding may be used to bandlimit transmission over a channel.

In addition to bandlimiting, correlative coding avoids Nyquist limitations by introducing cross correlation and a limited amount of intersymbol interference. By removing symbol correlative independence, higher rates may be achieved than possible with Nyquist limitations associated with more highly correlated symbols. Tradeoffs may involve an additional decoding step as a Viterbi decoding step or other such decoding step when information on a Partial Response channel is received. Processing tradeoffs may be necessary since removing correlative independence by preceding and correlative filtering may have the effect of introducing Gaussian products to coded information which must eventually be removed. Correlative coding is described in more detail in a text entitled "Communication Systems", A. Bruce Carlson, ©1986, McGraw-Hill and is incorporated herein by reference.

Another significant disadvantage of conventional thin film inductive heads may be an inability of such inductive heads to read data when media linear velocity slows below a threshold value. Reduced linear velocity may be most acute near the disk spindle or center. Even though spindle rotational velocity remains constant, linear velocity of a given point on a spinning disk platter decreases closer to the spindle. In an inductive head, generation of a read signal relies on relative motion between an inductive read head and flux fields recorded on a section of media. As linear velocity decreases, read signal characteristics change because of changes in relative motion and thus induction between media and head. In an extreme case, with no relative motion, no read signal would be generated from an inductive read head. Since magneto-resistive properties are independent of relative motion, MR heads may not exhibit such problems reading data from disk sections near the spindle with lower linear velocities.

MR heads have significantly increased areal density capability of disk drives using magnetic media. Hard disk drive capacity has been increasing proportional to increases in areal density achievable by manufacturers, while price per Mbyte has decreased in like proportion. By achieving higher areal density, more data may be stored on the same platter. With the exception of MR head circuitry, virtually all other disk drive components may remain the same. For commercial viability however, gains in areal density due to MR head technology must be accomplished with no significant increase in bit error probability.

Along with advantages of MR head use related to increased areal density and compact packaging come problems associated with increased susceptibility to errors caused by thermal asperities (TAs). TAs refer to recording signal anomalies caused by contact between an MR head and rough spots or asperities on media surfaces. Asperities may be caused by manufacturing defects or flecks of metal oxide on recording media surfaces. TA related errors may be caused by rapidly rising MR head temperature due to momentary contact with an asperity. A rise in temperature may change head resistance causing a corresponding transient in output signal voltage. Since information read from magnetic media may correlate to MR head output voltage, transients in MR head voltage may correlate directly to errors. When severe, TA induced burst errors may be unrecoverable since number of resulting errors exceeds the syndrome or capability of error correcting codes (ECC) used in read processing circuits. TAs are described in more detail in a publication entitled "Magneto-Resistive Head Thermal Asperity Digital Compensation", R. L. Galbraith, et al, IBM Storage Systems Product Division, Feb. 17, 1992 incorporated herein by reference.

One particularly troublesome problem with TAs making them difficult to detect and correct may be their timing. TA related transients in MR head output may occur with risetimes measured in nanoseconds. Fast risetimes may make TAs difficult to detect in a sufficient amount of time to invoke corrective measures. Moreover, with durations of several microseconds, TAs may cause continuous error bursts before dissipating. The amplitude of transients caused by TAs may be greater than twice peak amplitude of the MR head read signal.

Galbraith, et al describes an Analog to Digital Converter (ADC) expanded headroom technique and a timing and gain correction hold technique. Galbraith's method may have the disadvantage of reduced signal-to-noise ratio when operated in an expanded headroom mode. Moreover, lack of control of TAs during hold periods when timing and control loop operation is suspended may cause a complete loss of read data synchronization and gain synchronization.

Ottensen, et al., U.S. Pat. No. 5,367,409, discloses even harmonic distortion compensation for digital data detection. Ottensen's method may have disadvantages associated with an expensive oversampling ADC and adder. Hardware costs associated with an oversampling ADC and adder coupled with an extra addition step may comprise disadvantages which distinguish the present invention from Ottensen.

SUMMARY OF THE INVENTION

To overcome the limitations of the prior art, within a direct access storage device, the present invention may be embodied in a circuit for processing a read signal. A read signal may be derived from a transducer. Transducer output may be proportional to magnetic information stored on at least one rotating magnetic disk. Such a transducer may be of the type known as magneto resistive and comprise an element, biased with a current, the output of which changes in proportion to magnetic fields which may come into proximity to it. In particular, a thin film permalloy element may be used.

Data read from an MR transducer may be processed in a series of steps for recovering information originally stored on magnetic media such as a rotating disk. Flux fields representing stored information may modulate current flow in an MR transducer thus generating an information signal which may be input to an analog amplifier or preamp and a Variable Gain Amplifier (VGA). VGA output may be input to a continuous time filter for performing normal analog signal processing known in the art. Output of the continuous time filter may be made available for sampling.

A sampler or analog-to-digital converter of the kind known in the art may sample analog levels input from a continuous time filter and output such samples. A sampled filter block may be used to remove DC level shifts from a sampled read signal. FIR equalized samples may be input to a MUX and output to a FIR filter block selectively upon the occurrence of a TA. Gain and Timing Loops may operate on FIR filter output and be fed back as control signals to control sampler. FIR filter output may pass through a Viterbi processing block to generate highest likelihood values for data.

BRIEF DESCRIPTIONS OF THE DRAWINGS

DETAILED DESCRIPTION OF THE INVENTION

The descriptions herein are by way of example only illustrating the preferred embodiment of the present invention. However, it should be appreciated that the method and apparatus of the present invention may be applied in a similar manner in other embodiments without departing from the spirit of the invention.

Figure 1:
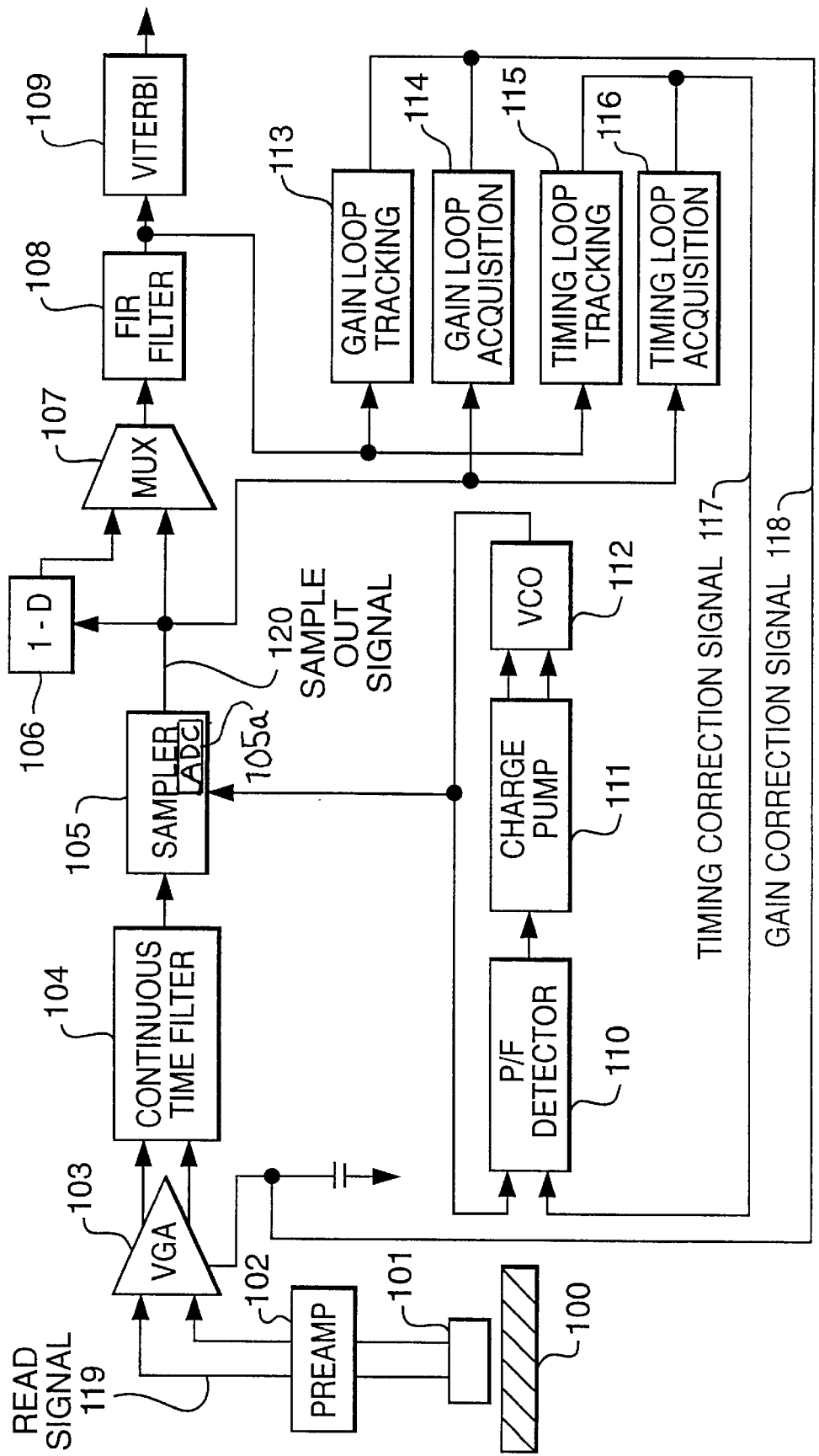
FIG. 1 is a block diagram of illustrating a 1-D sampled filter block disposed within an MR head read signal processing circuit of the present invention.

FIG. 1 is a block diagram of illustrating a 1-D sampled filter block of the present invention. Rotating magnetic media 100 may comprise a magnetic disk platter with a ferro-magnetic or other metal or metal oxide coating susceptible to storing information as magnetic flux signatures. Rotating magnetic media 100 may contain such information as magnetic flux signatures. Head element 101 may comprise a magneto resistive (MR) head element or other element which may be continuously biased with a sense current and may respond to a magnetic field with a corresponding change in material property affecting resistance in linear or logarithmic proportion.

Head element 101 may be placed in close proximity to rotating magnetic media 100 by a head support mechanism known in the art and may produce a signal which is input to preamp 102. Preamp 102 may supply a continuous sense current to head element 101 and may amplify read signal 119 generated in response to magneto-resistive action between head element 101 magnetic information encoded upon rotating magnetic media 100. Output of preamp 102 may be input to Variable Gain Amplifier, (VGA) 103. VGA 103 may output an amplified read signal to continuous time filter block 104 based on changes in gain correction signal 118 supplied to VGA 103 from gain tracking loop 113 and gain acquisition loop 114. Output of VGA 103 may be input to continuous time filter block 104 which may comprise a 7 pole, 2 zero equiripple filter for standard signal conditioning known in the art. Output of continuous time filter block 104 may be input to sampler 105 for sampling amplified read signal level and providing sample out signal 120 to sampled filter block 106, MUX 107, gain loop acquisition block 114, and timing loop acquisition block 116.

MUX 107 receives sample out signal 120 which may comprise quantized read signal level samples provided via an analog to digital converter (ADC) 105*a* located in sampler 105 and samples from sampled filter block 106. Sampled filter block 106 may comprise a 1-D filter configuration. Depending upon system Partial Response parameters, delay factor D could be changed to $D^2$ or $D^N$ where N is an integer. Samples from sample out signal 120 and samples from sampled filter block 106 are selectively output from MUX 107 to FIR filter 108. FIR filter 108 is a Finite Impulse Response filter and may operate upon discrete input samples using a series of coefficients or taps known in the art. In the preferred embodiment, a 7 tap FIR filter may be used although other asymmetrical FIR filters may yield acceptable results. In general, when selecting number of filter taps a tradeoff must be made between amount of processing necessary to implement a filter with a particular number of taps and adequacy of filter response of the resulting filter.

Samples from sampled filter block 106 may be input to FIR filter 108 selectively upon occurrence of a TA disturbance. Samples output from FIR filter 108 may be input to Viterbi block 109, gain loop tracking block 113, and timing loop tracking block 115. Viterbi block 109 may be a PR4 Viterbi block as known in the art. Gain correction signal 118 output from gain loop tracking block 113 may be input as a variable gain setpoint for VGA amplifier 103 as describe above. Timing correction signal 117 output from timing loop tracking block 115 representing timing corrections to sampling rate may be input to phase/frequency detector 110. Phase and frequency errors may be input to charge pump 111 which accumulates a charge proportional to timing correction signal 117. Charge pump 111 outputs accumulated charge due to timing error as a voltage to Voltage Controlled Oscillator (VCO) 112. VCO 112 may output a signal with a corrected frequency which may be used to control sampling frequency of sampler 105 and which may be fed back to phase/frequency detector 110 for comparison with timing correction signal 117 output from timing loop tracking block 115.

After processing in FIR filter 108 samples may be input to Viterbi block 109 where maximum likelihood detection may be used to decode samples received within certain timing constraints. Viterbi decoding may be used to ascertain most probable bit values based on an input sequence of convolutionally encoded data. Viterbi decoding is based on a trellis or decision mapped to convolutional code space known in the art of communication on Gaussian channels. Thus, bit values originally recorded as an analog flux signature may be recovered, decoded and restored into original information in bytes.

Figure 2A:
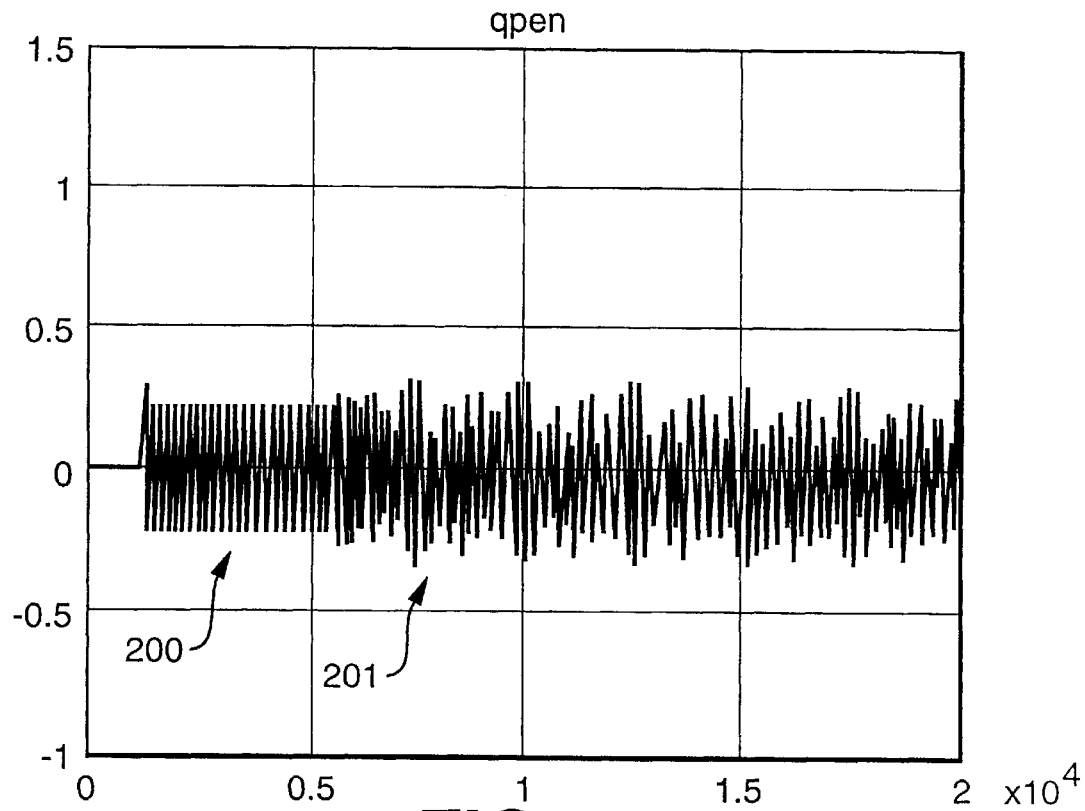
FIG. 2a is a graph illustrating a normal read signal using Sync Field, Sync Bytes, and random customer data.

FIG. 2*a* is a graph illustrating a normal read signal using Sync Field, Sync Bytes, and random customer data. Signal 200 represents Sync preamble and signal 201 represents random data. Signal 200 and 201 are normal signals and illustrate a read signal without Thermal Asperity disturbances.

Figure 2B:
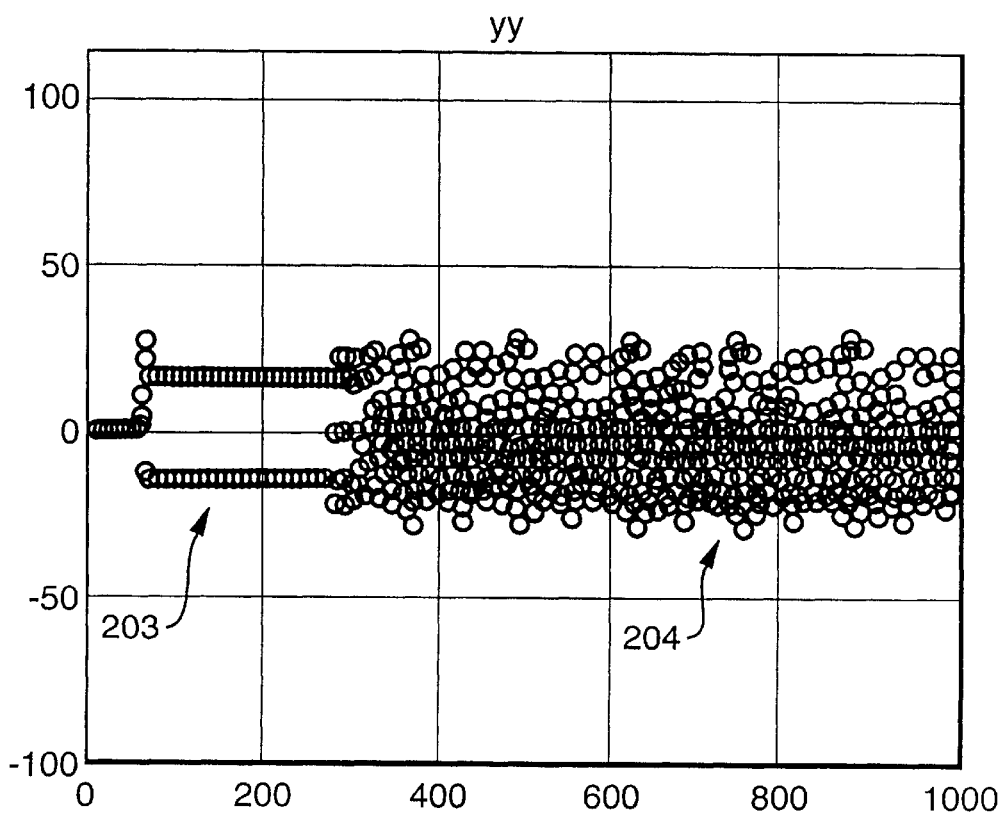
FIG. 2b is a graph illustrating a normal continuous time filter output.

FIG. 2*b* is a graph illustrating a normal continuous time filter output. Section 203 of FIG. 2*b* corresponds to output of continuous time filter block 104 when signal 200 of FIG. 2*a* is input. Section 204 of FIG. 2*b* corresponds to output of continuous time filter block 104 when signal 201 of FIG. 2*a* is input.

Figure 3A:
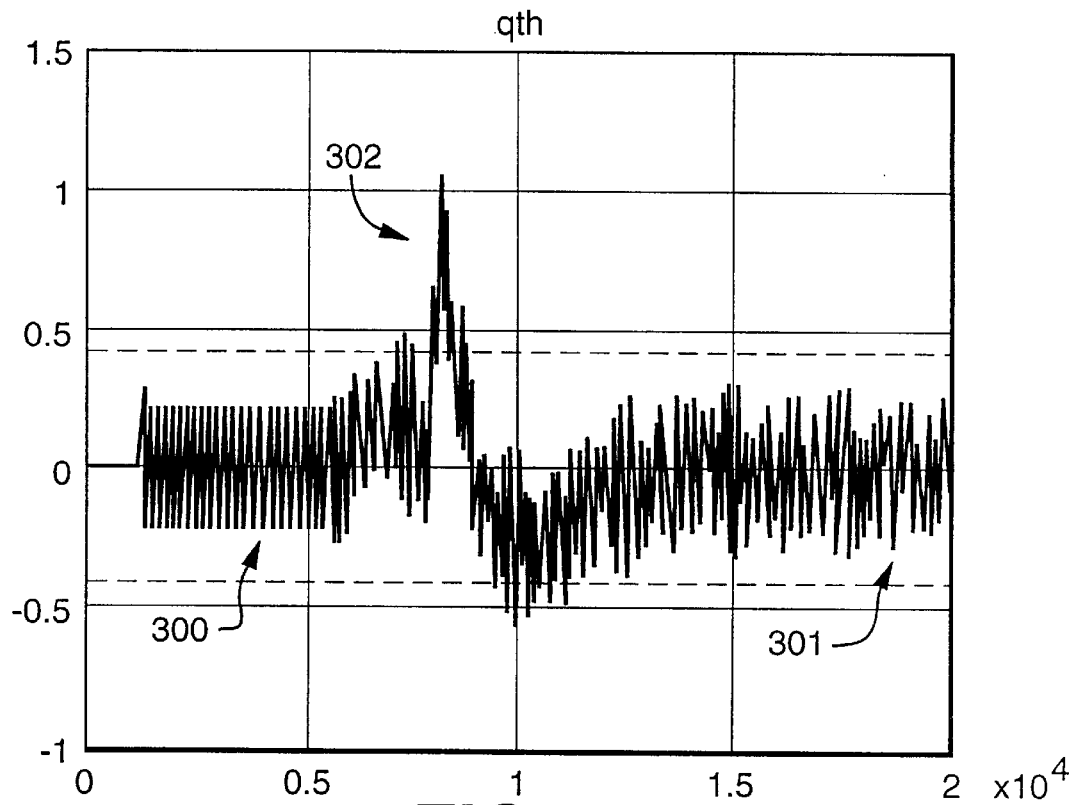
FIG. 3a is a graph illustrating a thermal asperity disturbance.

FIG. 3*a* is a graph illustrating a thermal asperity disturbance. Signal 300 represents Sync preamble and section 301 represents normal random customer data. Signal 302 represents a read signal upon occurrence of a Thermal Asperity disturbance. Note the level of signal 302 rises sharply in comparison to normal signal levels pictured in FIG. 2*a*.

Figure 3B:
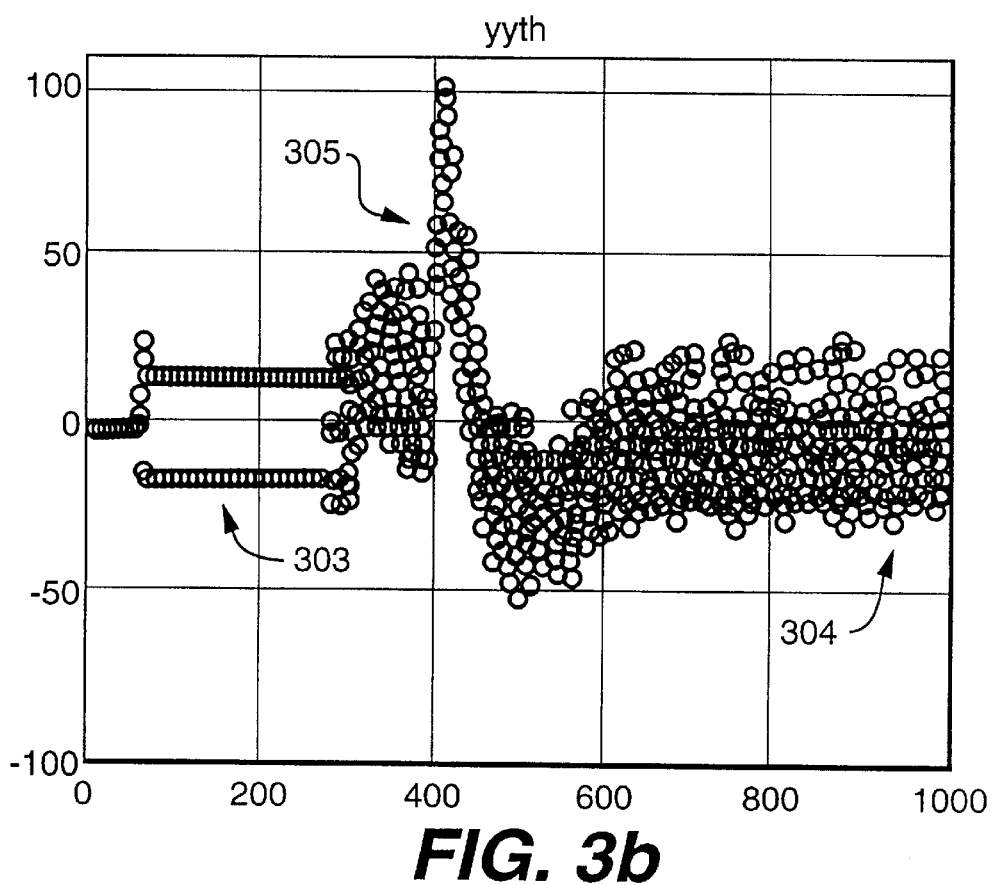
FIG. 3b is a graph illustrating a continuous time filter output during a thermal asperity disturbance.

FIG. 3*b* is a graph illustrating a continuous time filter output during a thermal asperity disturbance. Section 303 represents continuous time filter block 104 output corresponding to Sync preamble. Section 304 represents continuous time filter block 104 output during a Thermal Asperity disturbance.

Figure 4A:
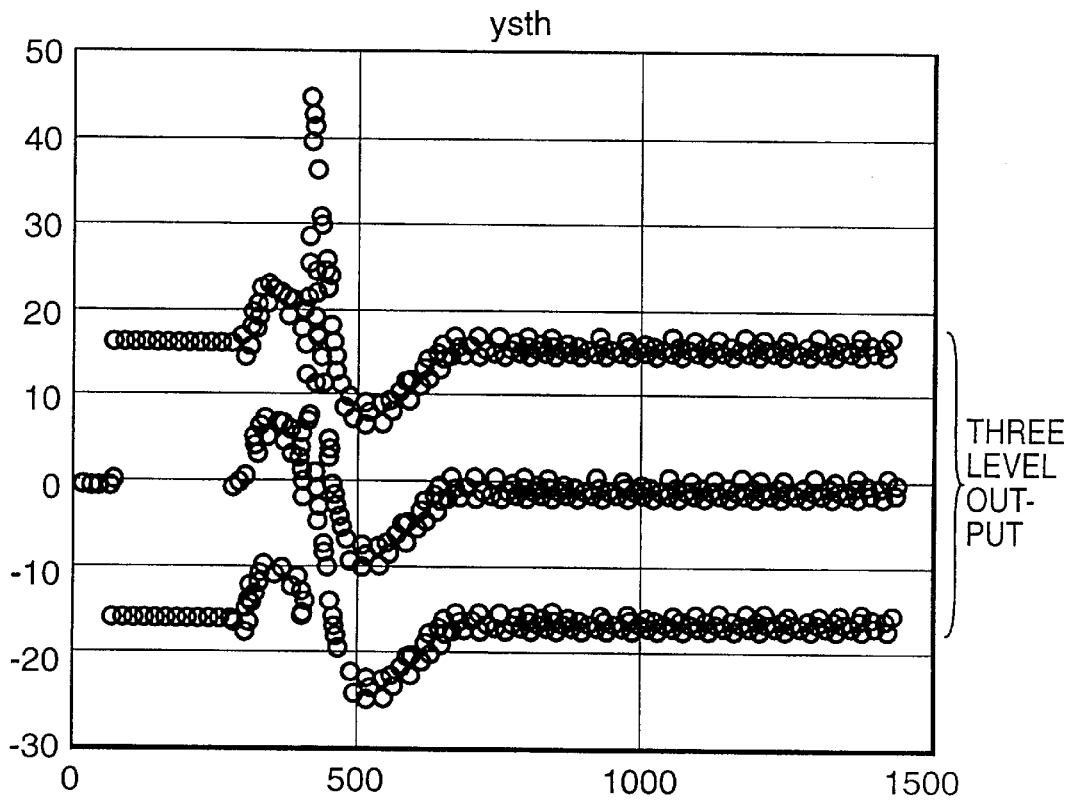
FIG. 4a is a graph illustrating a FIR filter output during a thermal asperity disturbance.

FIG. 4*a* is a graph illustrating a FIR filter output during a thermal asperity disturbance. Output of FIR filter block 108 is equalized to PR4 level which comprises 3 level output for data and 2 level output for synch preamble.

Figure 4B:
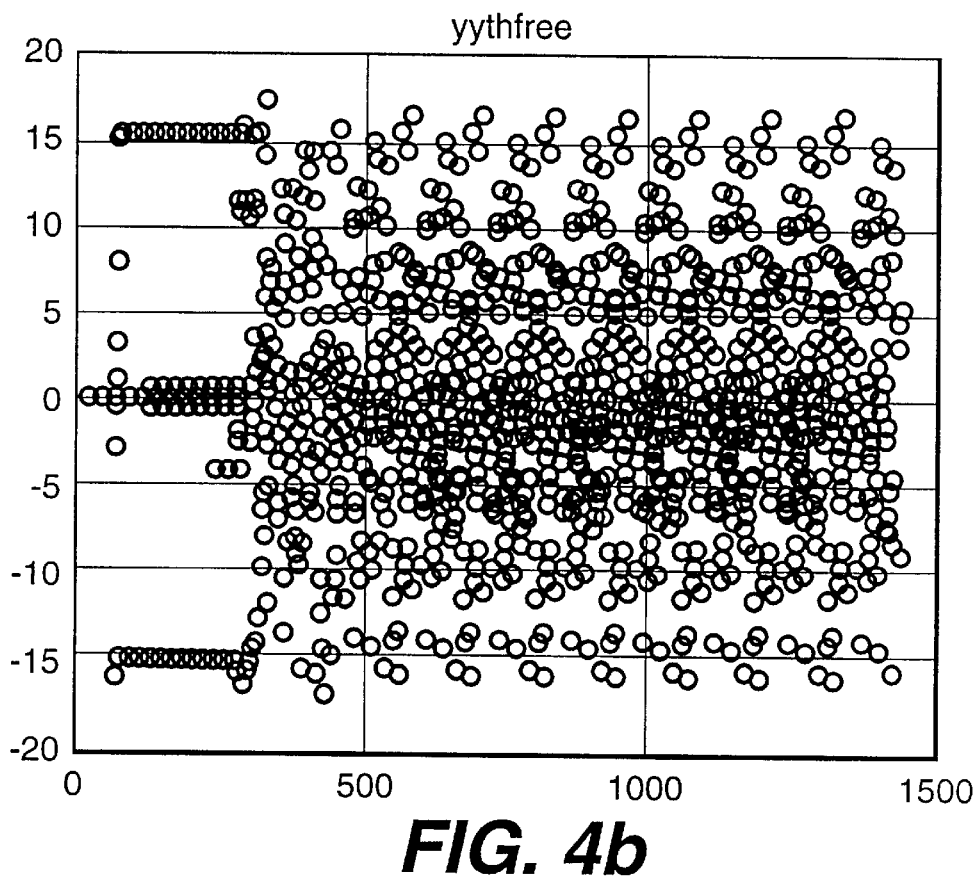
FIG. 4b is a graph illustrating removal of level shift by 1-D sampled filter block of FIG. 1 of the present invention.

FIG. 4*b* is a graph illustrating removal of level shift by sampled filter block 106 of the present invention. FIR filter 108 is provided with delayed samples from delay block 106 under control of MUX 107. Samples may be routed to delay block 106 when a Thermal Asperity is detected. Detection may be accomplished by methods known in the art. Retry methods will invoke delay block 106 processing when previous reads to a location resulted high error rates. FIR filter 108 may be of the symmetrical or asymmetrical type with a number of taps chosen by a designer. Typical taps number from 5 to 10 taps.

Figure 4C:
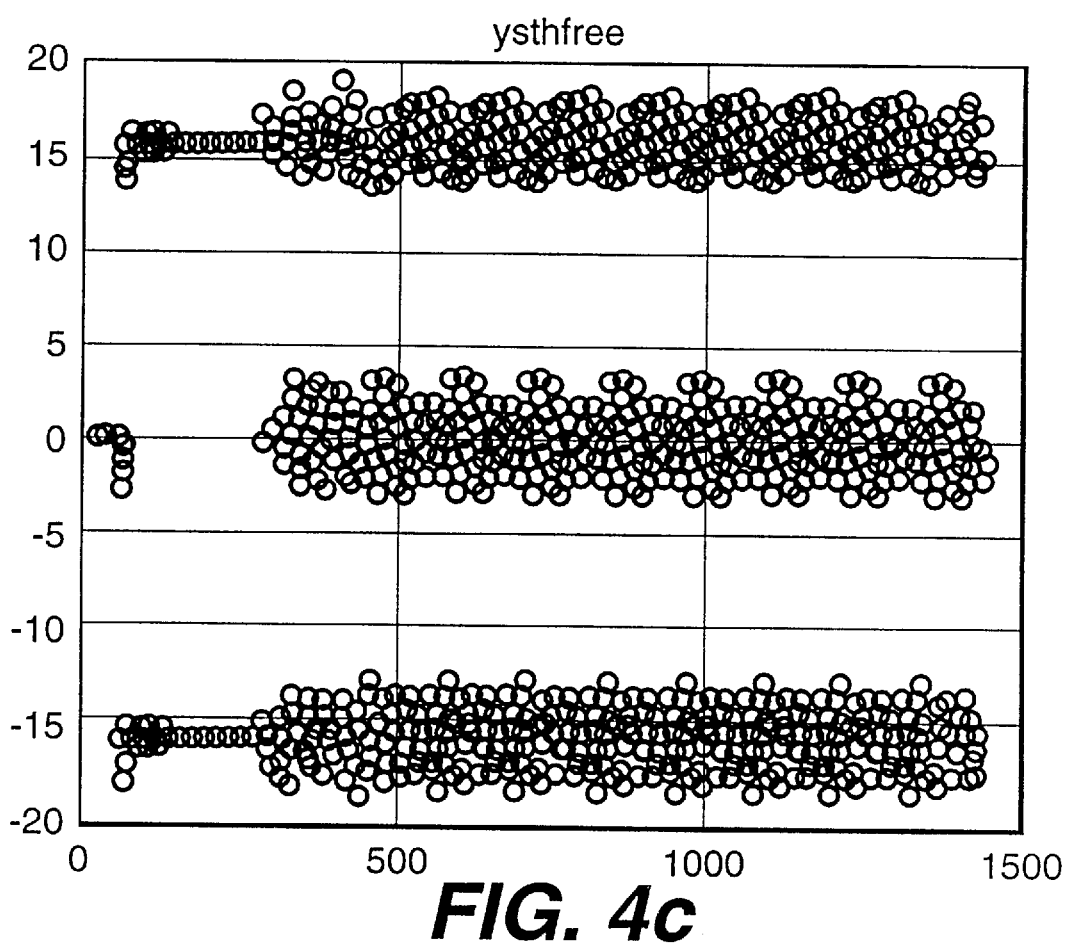
FIG. 4c is a graph illustrating a FIR filter output during a thermal asperity disturbance after passing through 1-D sampled filter block of FIG. 1 of the present invention.

FIG. 4*c* is a graph illustrating the output of FIR filter 108 during a thermal asperity disturbance after passing through sampled filter block 106 of the present invention.

Figure 5:
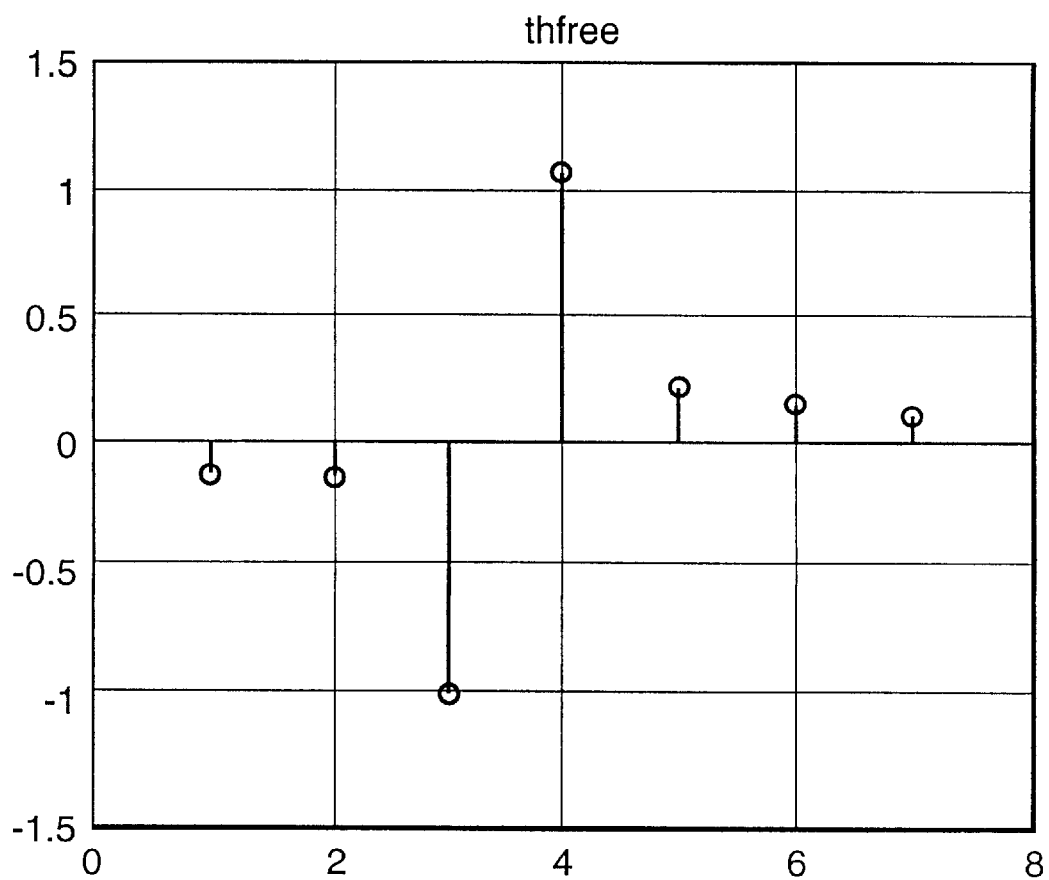
FIG. 5 is a graph illustrating the tap values of a FIR filter after sampled filter block of FIG. 1 of the present invention.

FIG. 5 is a graph illustrating tap values of sampled filter block 106 of the present invention. Note that in FIG. 7 seven tap values are shown. These tap values may be used to define an asymmetrical filter which may generate the outputs shown in FIG. 4*b*.

While the preferred embodiment and various alternative embodiments of the invention have been disclosed and described in detail herein, it may be apparent to those skilled in the art that various changes in form and detail may be made without departing from the spirit and scope of the invention.

For example, while the TA baseline shift compensation circuit is illustrated herein as being embodied in a disk drive, the present invention could be practiced on any recording system using an MR head and magnetic media. In particular, the MR head of the preferred embodiment may comprise any material exhibiting magneto resistive properties. Moreover, although the preferred embodiment is drawn to a circuit within a disk drive, the present invention may be applied to a series of circuits within a disk drive, or in other circuitry within a disk drive or disk controller without departing from the spirit and scope of the present invention.

We claim:

1. A circuit for processing a read signal in a direct access storage device, said circuit for removing transient level shifts in the read signal due to thermal asperities, said circuit comprising:

a circuit for receiving a read signal generated from a non-inductive transducer in response to proximate contact between said non-inductive transducer and magnetic flux fields recorded upon a magnetic media surface;

a sampler coupled to said circuit for converting read signal levels from the read signal into a discrete time digital sample stream at a predetermined sample rate and outputting the discrete time digital sample stream; and a sampling filter coupled to said sampler, said sampling filter having a first filter and a second filter, said second filter being configured to operate using a first filter parameter when level shifts in the discrete time digital sample stream are present, and to operate using a second filter parameter when level shifts are not present in the discrete time digital sample stream, said sampling filter being configured to provide said discrete time digital sample stream to said first filter when level shifts in the discrete time digital sample stream are present, said first filter removing the level shifts from the discrete time digital sample stream, said first filter providing a resulting sample stream to said second filter, said sampling filter also being configured to provide said discrete time digital sample stream directly to said second filter when level shifts in the discrete time digital sample stream are not present, said second filter outputting a filtered discrete time digital sample stream without level shifts.

2. The circuit of claim 1 wherein said second filter comprises a Finite Impulse Response filter for filtering the discrete time digital sample stream.

3. The circuit of claim 2 wherein said Finite Impulse Response filter has between 5 and 10 taps for filtering the discrete digital time sample stream.

4. The circuit of claim 2 further comprising a Viterbi decoder that is coupled to said Finite Impulse Response filter, said Viterbi decoder for generating maximum likelihood values for the discrete time digital sample stream.

5. The circuit of claim 1 wherein said sampler comprises an analog-to-digital converter.

6. The circuit of claim 1 wherein said non-inductive transducer in said receiving step comprises a material which changes electrical transfer characteristics in linear proportion to a magnetic field of variable intensity and alignment acting upon it.

7. The circuit of claim 6 wherein said non-inductive transducer comprises a magneto-resistive (MR) transducer.

8. The circuit of claim 1 wherein said magnetic media comprises a rotating disk with a ferro-magnetic coating.

9. The circuit of claim 1 wherein said magnetic media comprises a rotating disk with a metallic coating.

10. The circuit of claim 1 wherein said magnetic media comprises a rotating disk with a metallic oxide coating.

11. The circuit of claim 1, wherein said first filter is a $(1-D^N)$ filter, where D is a delay factor, and N is an integer.

12. The circuit of claim 1, wherein the first filter parameter of said second filter comprises a series of coefficients.

13. The circuit of claim 12, wherein the series of coefficients are taps.

14. The circuit of claim 1, wherein the second filter parameter of said second filter comprises a series of coefficients.

15. The circuit of claim 14, wherein the series of coefficients are taps.

16. The method of claim 1, wherein in the steps of providing, said first filter is a $(1-D^N)$ filter, where D is a delay factor, and N is an integer.

17. A method in a direct access storage device for removing level shifts in a read signal due to thermal asperities, said method comprising:

receiving a read signal generated from a non-inductive transducer in response to proximate contact between said non-inductive transducer and magnetic flux fields recorded upon a magnetic media surface;

converting read signal levels from the read signal into a discrete time digital sample stream at a predetermined sample rate and outputting the discrete time digital sample stream; and determining if levels shifts in the discrete time digital sample stream are present, (i) if so, providing said discrete time digital sample stream to a first filter that is configured to remove level shifts from the discrete time digital sample stream, and to provide a resulting sample stream to a second filter configured to operate using a first parameter to filter said resulting sample stream when level shifts are present in the discrete time digital sample stream, said second filter outputting a filtered discrete time digital sample stream wherein the level shifts are removed;

(ii) if not, providing the discrete time digital sample stream directly to the second filter, said second filter being configured to operate using a second parameter to filter said discrete time digital sample stream when level shifts are not present in the discrete time digital sample stream, said second filter filtering the discrete time digital sample stream to output a filtered discrete time digital sample stream.

18. The method of claim 17 wherein in the steps of providing, said second filter comprises a Finite Impulse Response filter filtering the discrete time digital sample stream.

19. The method of claim 18, wherein in the steps of providing, said Finite Impulse Response filter is asymmetrical.

20. The method of claim 17, wherein in the steps of providing, said second filter comprises a Finite Impulse Response filter having between 5 to 10 taps, for filtering the discrete time digital sample stream.

21. The method of claim 18, wherein said sampled filter means further comprises a first Finite Impulse Response filter coupled to a second Finite Impulse Response filter and further comprising the step of coupling a Viterbi decoder to said Finite Impulse Response filter, said Viterbi decoder for generating maximum likelihood values for the discrete time digital sample stream.

22. The method of claim 17 wherein said converting step comprises the steps of: providing a sampler having an analog-to-digital converter, for converting read signal levels from the read signal into a discrete time digital sample stream at a predetermined sample rate.

23. The method of claim 17 wherein in said receiving step, said non-inductive transducer comprises a material which changes electrical transfer characteristics in linear proportion to a magnetic field of variable intensity and alignment action upon it.

24. The method of claim 23 wherein in said receiving step, said non-inductive transducer comprises a magneto-resistive (MR) transducer.

25. The method of claim 17 wherein in said receiving step, said magnetic media comprises a rotating disk with a ferro-magnetic coating.

26. The method of claim 17 wherein in said receiving step, said magnetic media comprises a rotating disk with a metallic coating.

27. The method of claim 17 wherein in said receiving step, said magnetic media comprises a rotating disk with a metallic oxide coating.

28. The method of claim 17, wherein in the steps of providing, the first filter parameter of said second filter comprises a series of coefficients.

29. The method of claim 28, wherein in the steps of providing, the series of coefficients are taps.

30. The method of claim 17, wherein in the steps of providing, the second filter parameter of said second filter comprises a series of coefficients.

31. The method of claim 30, wherein in the steps of providing, the series of coefficients are taps.

* * * * *